US010733552B2

(12) United States Patent
Vann et al.

(10) Patent No.: US 10,733,552 B2
(45) Date of Patent: *Aug. 4, 2020

(54) SYSTEMS AND METHODS FOR DEMAND TRACKING OF PRODUCTS BASED ON SALES AND CONTROLLING RESTOCKING AS A FUNCTION OF THE DETERMINED DEMAND IN A RETAIL ENVIRONMENT

(71) Applicant: Walmart Apollo, LLC, Bentonville, AR (US)

(72) Inventors: David L. Vann, Bentonville, AR (US); Robert J. Taylor, Rogers, AR (US); Nicholaus A. Jones, Bentonville, AR (US); Matthew A. Jones, Bentonville, AR (US); Daniel R. Shields, Lakeville, MN (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/405,539

(22) Filed: May 7, 2019

(65) Prior Publication Data

US 2019/0266535 A1 Aug. 29, 2019

Related U.S. Application Data

(63) Continuation of application No. 15/418,378, filed on Jan. 27, 2017, now Pat. No. 10,325,234, which is a
(Continued)

(51) Int. Cl.
*G06Q 10/06* (2012.01)
*G06Q 10/08* (2012.01)
*G06Q 30/02* (2012.01)

(52) U.S. Cl.
CPC ....... *G06Q 10/06315* (2013.01); *G06Q 10/08* (2013.01); *G06Q 10/087* (2013.01); *G06Q 30/02* (2013.01)

(58) Field of Classification Search
CPC .......................... G06Q 10/087; G06Q 20/203
See application file for complete search history.

(56) References Cited

U.S. PATENT DOCUMENTS

| 5,128,861 A | 7/1992 | Kagami |
| 5,168,445 A | 12/1992 | Kawashima |

(Continued)

FOREIGN PATENT DOCUMENTS

WO 2016019084 2/2016

OTHER PUBLICATIONS

Chen, Fangruo; "Optimal Policies for Multi-Echelon Inventory Problems with Batch Ordering"; Operations Research; vol. 48, No. 3; May-Jun. 2000; pp. 376-389.
(Continued)

*Primary Examiner* — Scott L. Jarrett
(74) *Attorney, Agent, or Firm* — Fitch, Even, Tabin & Flannery LLP

(57) ABSTRACT

A demand tracking system in a retail environment including a retail store having a plurality of product displays is provided. The system includes at least one processor coupled to a memory storing information regarding a demand for each product of a plurality of products in the retail store, the demand for each product including a difference between a current quantity of each product on a respective product display and a maximum capacity of the respective product display, an interface configured to receive product sales information and user action information and to provide user action requests, and a demand tracking component. The demand tracking component is configured to
(Continued)

adjust the demand for each of the plurality of products based on the product sales information and user action information.

20 Claims, 5 Drawing Sheets

Related U.S. Application Data continuation-in-part of application No. PCT/US2015/042781, filed on Jul. 30, 2015.

(60) Provisional application No. 62/030,909, filed on Jul. 30, 2014.

(56) References Cited

U.S. PATENT DOCUMENTS

| | | | |
|---|---|---|---|
| 5,237,496 | A | 8/1993 | Kagami |
| 6,006,196 | A | 12/1999 | Feigin |
| 6,151,536 | A | 11/2000 | Arnold |
| 6,341,269 | B1 | 1/2002 | Dulaney |
| 6,341,271 | B1 | 1/2002 | Salvo |
| 6,609,101 | B1 | 8/2003 | Landvater |
| 7,480,623 | B1 | 1/2009 | Landvater |
| 7,640,192 | B1 | 12/2009 | Givoly |
| 8,502,869 | B1 | 8/2013 | Fuhr |
| 9,659,275 | B2 | 5/2017 | Jones |
| 9,773,223 | B2 | 9/2017 | Vasantham |
| 9,852,396 | B2 | 12/2017 | Jones |
| 9,911,097 | B2 | 3/2018 | Jones |
| 9,916,560 | B2 | 3/2018 | Vasantham |
| 9,984,355 | B2 | 5/2018 | Jones |
| 1,032,523 | A1 | 6/2019 | Vann |
| 10,325,234 | B2 * | 6/2019 | Vann ........ G06Q 10/08 |
| 2001/0027418 | A1 | 10/2001 | Johnson |
| 2002/0072999 | A1 | 6/2002 | Andres |
| 2003/0182193 | A1 | 9/2003 | Kawamata |
| 2003/0200129 | A1 | 10/2003 | Klaubauf |
| 2004/0034581 | A1 | 2/2004 | Hill |
| 2004/0128212 | A1 | 7/2004 | Zieger |
| 2005/0187811 | A1 | 8/2005 | Freeman |
| 2006/0085235 | A1 * | 4/2006 | Nguyen ........ G06Q 10/087 705/28 |
| 2007/0016494 | A1 | 1/2007 | Brown |
| 2007/0061210 | A1 | 3/2007 | Chen |
| 2007/0276745 | A1 | 11/2007 | Harinarayan |
| 2008/0071649 | A1 | 3/2008 | Dunst, Jr. |
| 2008/0086392 | A1 | 4/2008 | Bishop |
| 2009/0319401 | A1 | 12/2009 | Rao |
| 2010/0010868 | A1 | 1/2010 | Aimone Catti |
| 2010/0138281 | A1 | 6/2010 | Zhang |
| 2011/0055172 | A1 | 3/2011 | Tan |
| 2011/0288670 | A1 | 11/2011 | Funaki |
| 2012/0004944 | A1 | 1/2012 | Bachman |
| 2012/0150700 | A1 | 6/2012 | Babar |
| 2013/0039543 | A1 | 2/2013 | Fuhr |
| 2013/0211977 | A1 | 8/2013 | Lyon |
| 2013/0235206 | A1 | 9/2013 | Smith |
| 2013/0310967 | A1 | 11/2013 | Olson |
| 2014/0100769 | A1 | 4/2014 | Wurman |
| 2014/0156348 | A1 | 6/2014 | Sinkel |
| 2014/0172649 | A1 | 6/2014 | Cancro |
| 2014/0279290 | A1 | 9/2014 | Rimnac |
| 2015/0178671 | A1 | 6/2015 | Jones |
| 2015/0262116 | A1 | 9/2015 | Katircioglu |
| 2017/0132560 | A1 | 5/2017 | Jones |
| 2017/0140317 | A1 * | 5/2017 | Vann ............... G06Q 10/087 |

OTHER PUBLICATIONS

Chen, Shuang et al.; "Algorithms for multi-item procurement planning with case packs"; IIE Transactions; vol. 44; 2012; pp. 181-198.

Eroglu, Euneyt et al.; "The Backroom Effect in Retail Operations"; Production and Operations Management; vol. 22, No. 4; Jul.-Aug. 2013; pp. 915-923.

Ketzenberg, Michael et al.; "Inventory policy for dense retail outlets"; Journal of Operations Management; vol. 18; 2000; pp. 303-316.

Martin, André et al.; "Flowcasting the Retail Supply Chain"; Factory 2 Shelf Publishing; 2006; pp. 1-304.

PCT; App No. PCT/US2015/042781; International Search Report and Written Opinion dated Oct. 23, 2015.

PCT; App. No. PCT/US2015/042781; International Preliminary Report on Patentability dated Feb. 9, 2017.

Spielmaker, Kristie Jean; "On Shelf Availability: A Literature Review & Conceptual Framework"; University of Arkansas, Fayetteville, Marketing Undergraduate Honors Theses; May 2012; pp. 1-20.

Trauzettel, Prof. Dr. Volker; "Optimal Stocking of Retail Outlets: The Case of Weekly Demand Pattern"; 14th International Scientific Conference—Osijek, Croatia; 2014; pp. 3-11.

U.S. Appl. No. 15/418,378; Notice of Allowance dated Feb. 7, 2019.

U.S. Appl. No. 15/418,378; Office Action dated Oct. 9, 2018.

* cited by examiner

SYSTEMS AND METHODS FOR DEMAND TRACKING OF PRODUCTS BASED ON SALES AND CONTROLLING RESTOCKING AS A FUNCTION OF THE DETERMINED DEMAND IN A RETAIL ENVIRONMENT

RELATED APPLICATION(S)

This application is a continuation of U.S. application Ser. No. 15/418,378, filed Jan. 27, 2017, which a continuation-in-part of International Application No. PCT/US2015/042781, filed Jul. 30, 2015, entitled SYSTEMS AND METHODS FOR DEMAND TRACKING IN A RETAIL ENVIRONMENT, which claims the benefit of U.S. Provisional Application No. 62/030,909, filed Jul. 30, 2014, each of which is incorporated herein by reference in its entirety.

BACKGROUND OF THE DISCLOSURE

Field of the Invention

Aspects of the present invention relate to a system and method for tracking demand in a retail environment.

Discussion of Related Art

Retail stores generally display products on shelves to display various products to purchase to potential customers. Retail stores generally track shelf inventory levels for these products through a shelf inventory tracking system to help determine when products should be moved from a store room to the shelves. These systems, however, may become inaccurate over time due to, for example, shoplifting activities. Typically these systems require one or more retail store employees to count the number of each product remaining on the shelves to verify that the system is accurately tracking inventory. The product quantity counted by the retail store employees may be input to the inventory tracking system to correct any errors.

SUMMARY

Traditional inventory tracking systems require one or more employees to periodically count the number of items on store shelves and enter the quantity into the system. The manual inventory process is time consuming and subject to human error. Accordingly, systems and methods for demand tracking are provided that monitor the demand for products in displays (e.g., on shelves or in aisle bins). Various aspects of the systems and methods of demand tracking monitor the actions performed by retail store employees to accurately determine the demand for each item displayed in the store and self-correct any errors between the actual demand for a given product and the erroneous demand value stored.

According to one aspect, a demand tracking system in a retail environment including a retail store having a plurality of product displays is provided. The system comprises at least one processor coupled to a memory storing information regarding a demand for each product of a plurality of products in the retail store, the demand for each product including a difference between a current quantity of each product on a respective product display of the plurality of product displays and a maximum capacity of the respective product display, an interface, executed by the at least one processor, configured to receive product sales information and user action information and to provide user action requests, and a demand tracking component, executed by the at least one processor. The demand tracking component is configured to increase, responsive to receiving product sales information including an indication of a product sold of the plurality of products and a quantity sold, the demand for the at least one product sold by a value equal to the quantity sold, determine whether the demand for the product sold transgressed a threshold, and generate, responsive to the demand for the product sold transgressing the threshold, a user action request including a first instruction to restock a first quantity of the product sold to the product display, the first quantity equal to the demand of the product sold.

In one embodiment, the demand tracking component is further configured to set the demand to zero responsive to receiving the user action information including an indication that the product sold has been restocked.

In one embodiment, the product sold is one of a case item type and an individual item type. In this embodiment, the demand tracking component may be further configured to decrease the demand for the product sold at least in part by setting the demand to zero responsive to the product sold having the individual item type. The demand tracking component may also be further configured to decrease the demand for the product sold at least in part by decreasing the demand by a value equal to an integer multiple of a case size responsive to the product sold having the case item type.

In one embodiment, the demand tracking component is further configured to determine whether the demand is understated for the product sold based on the user action information. In this embodiment, the demand tracking component may be further configured to generate a user action request including a second instruction to restock a second quantity of the product sold to the product display, the quantity equal to the understated demand of the product sold.

In one embodiment, the demand tracking component is further configured to determine whether the demand is overstated for the product sold based on the user action information. In this embodiment, the demand tracking component may be further configured to decrease the demand for the product sold responsive to determining that the demand is overstated.

In one embodiment, the interface is further configured to receive product receiving information including an indication of the product received and a quantity of the product received and wherein the demand tracking component is further configured to decrease the demand for the received product responsive to receiving the product receiving information.

According to one aspect, a computer implemented method for tracking demand in a retail environment including a retail store having a plurality of product displays is provided. The method comprises storing a demand for each product of a plurality of products in the retail store, the demand for each product including a difference between a current quantity of each product on a respective product display of the plurality of product displays and a maximum capacity of the respective product display, receiving product sales information including an indication of a product sold of the plurality of products and a quantity sold, increasing the demand for the at least one product sold by a value equal to the quantity sold, determining whether the demand for the product sold transgressed a threshold, and generating, responsive to the demand for the product sold transgressing the threshold, a user action request including a first instruction to restock a first quantity of the product sold to the product display, the first quantity equal to the demand of the product sold.

In one embodiment, the act of receiving the product sales information further includes receiving product sales information including an indication of the product type, the product type including one of a case item type and an individual item type. In this embodiment, the method may further comprise receiving user action information including an indication that the product sold has been restocked and setting the demand to zero responsive to receiving the user action information and the product sold having the individual item type. The method may also further comprise receiving user action information including an indication that the product sold has been restocked and decreasing the demand by a value equal to an integer multiple of a case size responsive to receiving the user action information and the product sold having the case item type.

In one embodiment, the method further comprises receiving user action information and determining whether the demand is understated for the product sold based on the user action information. In this embodiment, the method may further comprise generating a user action request including a second instruction to restock a second quantity of the product sold to the product display, the quantity equal to the understated demand of the product sold.

In one embodiment, the method further comprises receiving user action information and determining whether the demand is overstated for the product sold based on the user action information. In this embodiment, the method may further comprise decreasing the demand for the product sold responsive to determining that the demand is overstated.

In one embodiment, the method further comprises receiving product receiving information including an indication of the product received and a quantity of the product received and decreasing the demand for the received product responsive to receiving the product receiving information.

According to one aspect, a non-transitory computer readable medium having stored thereon sequences of instruction for tracking demand in a retail environment including a retail store having a plurality of product displays is provided. The instructions include instructions that will cause at least one processor to store a demand for each product of a plurality of products in the retail store, the demand for each product including a difference between a current quantity of each product on a respective product display of the plurality of product displays and a maximum capacity of the respective product display, receive product sales information including an indication of a product sold of the plurality of products and a quantity sold, increase the demand for the at least one product sold by a value equal to the quantity sold, determine whether the demand for the product sold transgressed a threshold, and generate, responsive to the demand for the product sold transgressing the threshold, a user action request including an instruction to restock a quantity of the product sold to the product display, the quantity equal to the demand of the product sold.

BRIEF DESCRIPTION OF DRAWINGS

The accompanying drawings are not intended to be drawn to scale. In the drawings, each identical or nearly identical component that is illustrated in various FIGS. is represented by a like numeral. For purposes of clarity, not every component may be labeled in every drawing. In the drawings.

DETAILED DESCRIPTION

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

As described above, inventory tracking systems traditionally monitor shelf inventory levels in a retail store and require one or more retail store employees to periodically count the shelf inventory and adjust the inventory level in the tracking system. Accordingly, aspects of the current disclosure relate to a demand tracking system that monitors the demand for products in a retail store display (e.g., on a shelf or in an aisle bin) by cataloging various actions performed by, for example, retail store employees in addition to product sales and receiving actions.

Example Demand Tracking System

Figure 1:
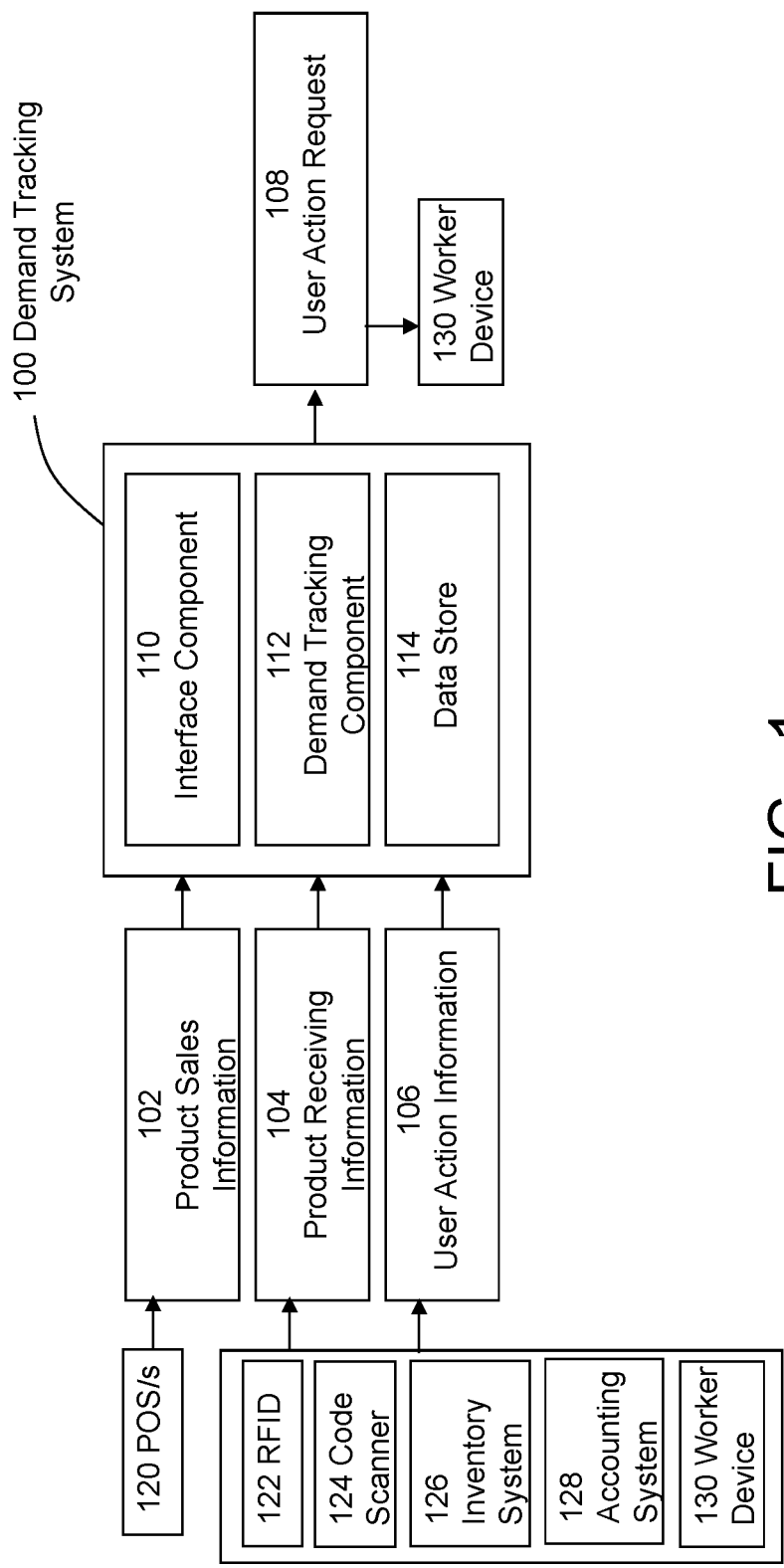
FIG. 1 is a block diagram illustrating a system for tracking demand in a retail environment in accordance with at least one embodiment described herein.

FIG. 1 illustrates system including a demand tracking system 100 constructed to track the demand for products on display in a retail environment, in accordance with some embodiments. The demand tracking system 100 receives product sales information 102 from one or more point of sale (POS) systems 120, product receiving information 104 from one or more RFID readers 122, bar code scanners 124, inventory system 126, accounting system 128, work devices (e.g., smart phones, scanners, RFID readers, etc.) 130 and/or other sources, and user action information 106 from worker devices 130, RFID readers 122, code scanners 124, inventory system 126 and/or other sources. The demand tracking system 100 outputs user action requests 108 that can be communicated to worker devices 130, computers visible to workers, printed, or the like. The demand tracking system 100 includes an interface component 110, a demand tracking component 112, and a data store 114, which may include one or more databases, and may be implemented as local data storage, remote data storage, and/or distributed over one or more data storage devices over a distributed computer and/or communication network (e.g., LAN, WAN, Internet, etc.).

The databases may be maintained by the demand tracking system and adjusted over time based on feedback, such as subsequent sales, subsequent lack of sales, threshold changes in sales, worker audits of products, and the like. Further, the databases may comprise multiple different records, tables, documents, and the like. For example, some embodiments include one or more sales data databases and/or tables that maintains information about items sold, transaction information, and other such information; receiving data databases and/or tables that maintains information about products received, quantities of items received, and other such information; binning data databases and/or tables maintaining information about products placed on shelves, bins, racks and other item support systems, locations of products, quantities of products and/or other such information; picking databases and/or tables maintaining information regarding scheduled product picks, completed product picks, quantities of items picked, workers associated with a pick, and/or other such information; item data databases and/or tables and/or inventory databases and/or tables that maintain information about current inventory, expected arrival of inventory, and/or other such information; other such databases or combination of two or more of such databases and/or tables. As a further example, in some implementations one or more of the databases may be implemented at least in part through a Structured Query Language (SQL) relational database. In some embodiments, the demand tracking system periodically (e.g., every 10 minutes, every 15 minutes, or other such periodic time) accesses databases and/or data sources to update the maintained data in the databases and/or tables.

In one embodiment, the product sales information 102 includes information associated with various sales transactions completed by a retail store. The product sales information 102 may be received via the interface component 110 from, for example, a point-of-sale (POS) system associated with the retail store. The product sales information 102 may include an indication of the product sold in a sales transaction and a quantity sold. For example, the product sales information 102 received by the demand tracking system 100 may indicate that two bottles of a particular soda were sold in the retail store. The particular item sold may be identified by Universal Product Code (UPC) associated with the product sold. It is appreciated that the system may receive product sales information 102 prior to the customer paying for the purchased product. For example, a customer may purchase an item via a web-application associated with a retail store and elect to pick-up the item in the retail store in addition to paying for the item upon pick-up. In this example, the system may receive product sales information 102 indicating that the item has been purchased.

In one embodiment, the product receiving information 104 includes information associated with the receipt of shipments to the retail store. The product receiving information 104 may be received from, for example, a receiving system. The product receiving information 104 may include an indication of the products received and an indication of the quantity of each product received. For example, the product receiving information 104 may indicate that fifty jars of a particular brand of peanut butter were received and are available to be placed on display.

In one embodiment, the user action information 106 includes information identifying various inventory related actions performed by, for example, retail store employees. The user action information 106 may be received from, for example, a handheld device associated with the retail store employee. The user action information 106 may include, for example, an indication of the specific action performed, an indication of the product moved, and an indication of the quantity of product moved. For example, the user actions performed may include a first type of user action indicating that the user completed a restocking request to move a quantity of at least one product from a store room of the retail store to a display, a second type of user action indicating that a user completed a restocking request but had to bring back at least a portion of the product back to the store room, and a third type of user action indicating that a user attempted a restocking request but needs to retrieve an additional quantity of the product from the store room to fill the display.

In one embodiment, the user action request 108 includes an instruction for at least one user to perform. The instruction may be, for example, transmitted to a handheld device associated with one or more retail store employees. The instructions may include, for example, instructions for at least one user to restock a particular product in a display by moving a specified quantity of the product from the store room of the retail store to the display associated with the product.

In one embodiment, the interface component 110 includes a user interface. In this embodiment, the demand tracking system 100 may receive information from the user via the user interface. For example, the demand tracking system 100 may receive user action information 106 via the user interface. In addition, a user may control the demand tracking component 112 via user interface 116.

The demand tracking component 112 processes received information (e.g., product sales information 102, product receiving information 104, and user action information 106) to determine the demand associated with each of a plurality of products. The demand for each product may be equal to the difference between the maximum display capacity for the product and the inventory in the display. For example, a shelf may hold ten jars of peanut butter and there may be eight jars of peanut butter on the shelf. In this example, the demand for peanut butter is equal to two jars of peanut butter.

In one embodiment, the demand tracking component 112 increases the demand for a particular product responsive to receiving product sales information 102 including an indication of the product sold and a quantity sold. For example, the demand tracking component 112 may receive product sales information 102 indicating that two tubes of toothpaste were sold. In this example, the demand tracking component 112 increases the demand for toothpaste by two tubes of toothpaste.

In some embodiments, the demand tracking component 112 may generate a user action request 108 including an instruction to restock at least one product from, for example, a store room to the display. The demand tracking component 112 may generate the user action request responsive to the demand for the product transgressing a threshold. The demand tracking component 112 may generate a user action request responsive to receiving product receiving information 104. For example, the demand tracking component 112 may receive product receiving information 104 indicating that a retail store has received a shipment of toothbrushes and generate a user action request 108 instructing at least one user to restock the toothbrush displays. Various processes to adjust the demand based on received product sales information and product receiving information are described below with reference to the product sales information processing process 200 illustrated in FIG. 2 and product receiving information processing process 300 illustrated in FIG. 3, respectively.

The demand tracking component 112 may adjust the demand for a product responsive to receiving user action information 106. For example, the demand tracking component 112 may decrease the demand for a product responsive to receiving user action information 106 indicating that a user has successfully restocked the display. The demand tracking component 106 may also determine whether the demand for a product is overstated (i.e., the actual demand is smaller than the system demand) or understated (i.e., the actual demand is larger than the system demand) based on user action information and correct the demand accordingly. Various processes to adjust the demand based on user actions are described below with reference to the user action information processing process 400 illustrated in FIG. 4.

It is appreciated that the demand tracking component 112 may also monitor an inventory level of one or more products in the store room. In one embodiment, the demand tracking component 112 monitors the inventory for a plurality of products in the store room concurrently with the demand. For example, the demand tracking component may decrease the store room inventory of a particular product responsive to receiving user action information 106 indicating that a user has restocked the particular product in a display. The demand tracking component may also increase the store room inventory responsive to receiving product receiving information 104 indicating that the retail store has received a shipment of the particular product.

The demand tracking system applies the rules to improve the evaluation of product demand, product receiving information, product sales, worker actions, and the like, to improve product demand tracking and tracking product availability and demand on the sales floor of one or more shopping facilities. The demand tracing system improves product demand tracking over other systems and human decisions through, in part, the access to additional information, evaluation of that information in a time that can be used in making business decisions that typically were unable to be considered by humans even if they had access to the information, and the application of rules that often provide decisions that are typically not determined by human decisions. Further, the demand tracking system evaluates information relative to one or more sets of rules to provide improved evaluations and automate at least the direction of one or more actions to adjust the sales floor demand in a time that previously could not realistically be done by a human and with higher reliability and greater accuracy. The applied rules are limited to available information, and often are further limited by one or more thresholds, which may be user defined or system determined over time. Further, the rules are limited to automating limited decisions, and in at least some instances can be overridden by a human intervention. By providing the automated product tracking evaluations, the product tracking system can automate at least part of the decision process by accesses data and in some instances large amounts of data that were not previously considered by humans or could not be processed by humans within a reasonable time period to make the needed business decisions. Further, the product tracking system can evaluate product inventory, receiving information, sales information, user actions and/or other such information relative to multiple different sets of rules, which typically cannot be considered by a human or team of humans within a reasonable amount of time to make a business decision, and implements the rules in a different way than a human team would evaluate the information and parameters. Further, such information typically is not available to humans, and human workers do not fully consider current conditions or parameters that may have changed since a previous decision was made that may affect subsequent decisions.

In some embodiments, the components described above with regard to FIG. 1 are software components that are executable by, for example, a computer system. In other embodiments, some or all of the components may be implemented in hardware or a combination of hardware and software. Other example demand tracking processes are described below with reference to FIGS. 2-4 that may be executed by a computer system such as the computer system described below with reference to FIG. 5.

Example Demand Tracking Processes

As described above with reference to FIG. 1, several embodiments perform processes that track demand for various products in a retail environment. In some embodiments, these demand tracking processes are executed by a microprocessor-based computer system, such as computer system 500 described below with reference to FIG. 5.

Figure 2:
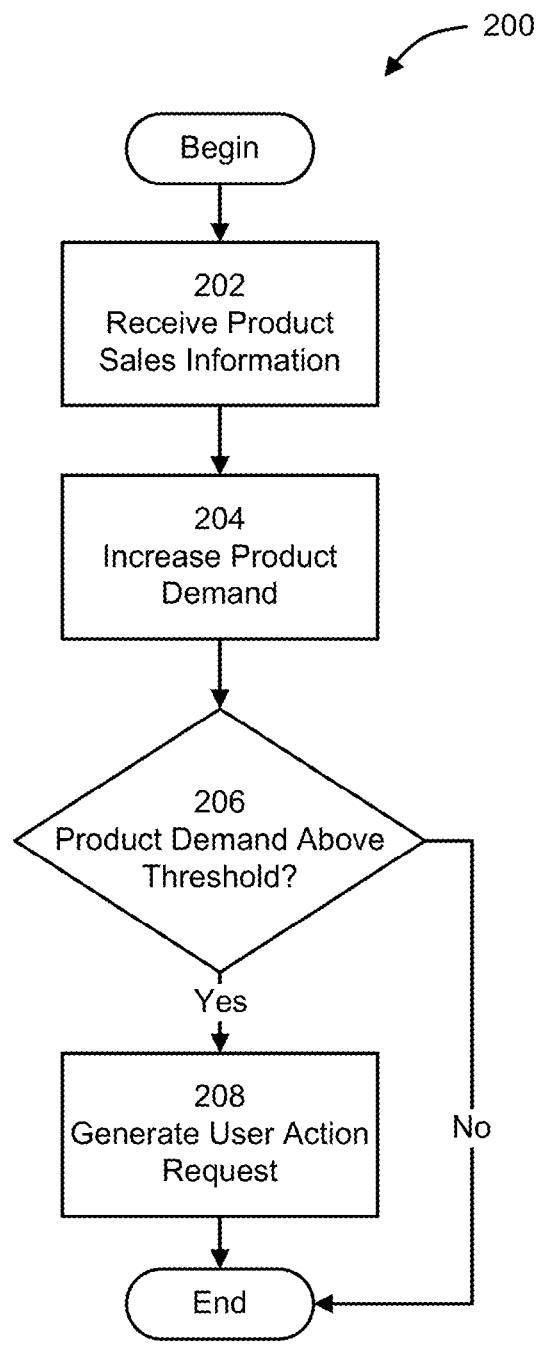
FIG. 2 is a flow chart illustrating a process for processing product sales information in accordance with at least one embodiment described herein.

FIG. 2 is a flow chart illustrating a product sales information processing process 200 performed by a computer system in accordance with at least one embodiment described herein. The product sales information processing process 200 adjusts the demand for various products based on received product sales information and corresponding demand tracking rules, thresholds, and other parameters maintained in one or more data stores 114, databases, and/or rules engines. The product sales information processing process 200 begins in act 202.

In act 202, the system receives product sales information. Typically, the product sales information is received from one or more point-of-sale systems at the retail facility, point-of-sale systems of an on-line retail service of a retail entity, sales entered through an order sales system that receives sales implemented in response to receiving customer orders (e.g., via phone, emails, fax, etc.), and/or other such sales information. The product sales information may include an indication of the product sold in a sales transaction and a quantity sold. In act 204, the system accesses at least a first set of demand tracking rules (e.g., sales demand rules) and based on applying at least one rule increases the demand for the product indicated in the received product sales information based on the first set of rules. The system, for example applying a first rule, may increase the demand by a value equal to the quantity sold indicated in the received product sales information. For example, the product sales information may indicate that ten jars of blueberry jam were sold and based on the first rule the system may increase the demand for blueberry jam by ten jars. The first rule may be applied in response to one or more factors, such as previously known quantities of inventory, rates of sale, how recent an audit was performed, and other such factors. In other implementations, one or more rules may dictate a different adjustment to demand. For example, a rule may dictate a multiplier factor that is applied to the quantity of sales. The multiplier may be determined based on one or more additional rules and/or parameters, such as expected shipments, a threshold margin of error, intent to avoid overstating, how recent an audit was performed, and the like.

In act 206, the system accesses a set of at least one threshold rules of the demand tracking rules, and applying at least one rule of the threshold set of rules to determine whether the demand for the product has transgressed a threshold. The threshold may be equal to a percentage of the maximum capacity of space in the display. For example, the threshold may be a quantity equal to 50% of the maximum capacity of the display. If the demand has transgressed the threshold, the system proceeds to act 208 and initiates one or more actions, such as generates a user action request including an instruction to restock a display with a specified quantity of the product to fill the display. Otherwise, in some implementations, the product sales information processing process 200 ends. Additionally or alternatively, some embodiments apply one or more demand tracking rules to determine quantities of a threshold.

Figure 3:
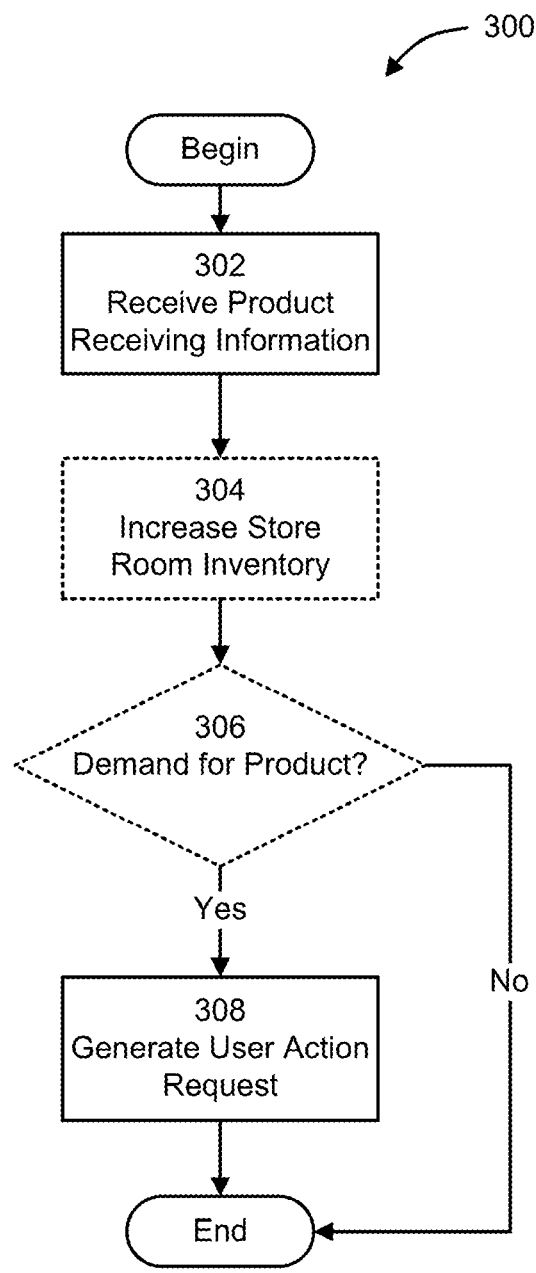
FIG. 3 is a flow chart illustrating a process for processing product receiving information in accordance with at least one embodiment described herein.

FIG. 3 is a flow chart illustrating a product receiving information processing process 300 performed by a computer system in accordance with at least one embodiment described herein. The product receiving information processing process 300 adjusts the demand for various products based on received product receiving information. The product receiving information processing process 300 begins in act 302.

In act 302, the system receives product receiving information. The product receiving information may include an indication of the product received and a quantity of the product received.

In optional act 304, the system accesses a set of receiving inventory rules of the demand tracking rules, and applying one or more of these rules may increase a store room inventory associated with the product. The system may increase the store room inventory of the received product by a quantity equal to the quantity added to the store room. For example, the system applying a first receiving inventory rule may increase the store room inventory by a value equal to the quantity of the product received.

In optional act 306, the system may apply one or more demand tracking rules to determine whether there is sufficient demand for the received product. The system may determine whether the demand for the received product is a value greater than a threshold value (e.g., greater than zero). The threshold may vary depending on expected sales, historic sales, current demand, and/or other such factors. Again, the one or more rules typically take into consideration one or more of these factors in determining a threshold and/or when demand is sufficient. If the system determines that there is sufficient demand for the product, the system proceeds to act 308 and generates a user action request to restock the display associated with the received product. One or more rules may be applied to determine a quantity of product to restock on the shelves. The rules may consider current stock levels, expected sales, historic sales, expected shipments, employee availability, and/or other such information. Otherwise, the product receiving information processing process 300 ends. The application of the rules provides results that are often different than provided through human decisions. Further, the demand tracking system 100 accesses information that is not readily available to someone, often includes more information than someone could evaluate in real time and provide a fully informed decision within a time period to make the needed business decisions.

In one embodiment, act 304 of increasing store room inventory and act 306 of determining whether there is demand for the received product are both omitted. In this embodiment, the system may, based on a set of one or more request rules of the demand tracking rules, automatically generate a user action request in act 308 to restock the display upon receipt of the shipment and decrease the demand, for example, by a value equal to the lesser of the quantity of the product received and the remaining shelf space. For example, the system may receive product receiving information in act 302 indicating that 15 jars of peanut butter were received and there are 10 spots left on the corresponding shelf (i.e., the demand is 10). In this example, the system may automatically decrease the demand associated with the jars of peanut butter by 10 units. It is appreciated that the system may also automatically decrease the demand for the received product without generating an explicit user action request. For example, the retail store may have a standard procedure to bring all received items to the floor. In this example, the system may, based on one or more requests rules, assume that one or more retail store employees have performed consistently with the procedure and automatically decrease the demand accordingly.

Figure 4:
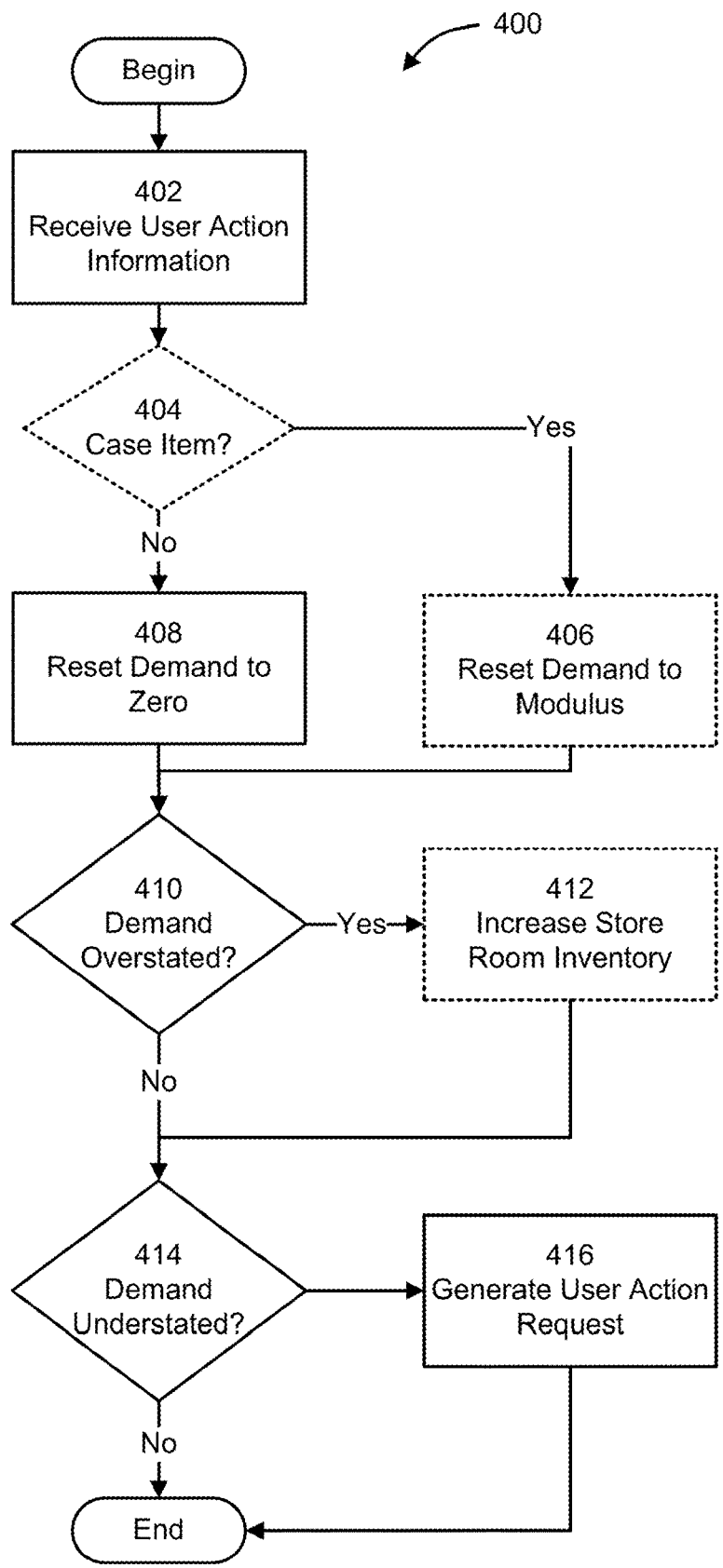
FIG. 4 is a flow chart illustrating a process for processing user action information in accordance with at least one embodiment described herein.

FIG. 4 is a flow chart illustrating a user action information processing process 400 performed by a computer system in accordance with one or more sets of rules in accordance with at least one embodiment described herein. The user action information processing process 400 adjusts the demand for various products based on the one or more sets of rules and on received user action information. The user action information processing process 400 begins in act 402.

In act 402, the system receives user action information. The user action information 106 may include, for example, an indication of the specific action performed, an indication of the product moved, and an indication of the quantity of product moved.

In optional act 404, the system determines whether the product is a case item or other such collection of items. A case item may include an item that is received in the retail store in packages and placed in the display for sale individually. For example, a case item may include a particular brand of lemonade that is received by the retail store in packages of fifty bottles of lemonade and are put in the display individually. If the system determines that the item is a case item, the system may proceed to optional act 406 to apply one or more rules and reset the demand for the product to a modulus. Otherwise, in some embodiments, the system proceeds to act 408 and resets the demand to zero.

In optional act 406, the system may, based on the application of a set of one or more rules as a function of user action, reset the demand to a modulus by decreasing the demand by a value equal to an integer multiple of the packaged quantity. For example, the demand for a bottle of lemonade in a display may be 110 bottles and the system may receive user action information indicating that a retail store employee has restocked the display. In this example, the system may decrease the demand for the lemonade by an integer multiple of the quantity received in a package (e.g., a 100 unit package) leaving the demand at 10 units. In some embodiments, the system may further decrease a store room inventory level by an amount equal to the decrease in demand.

In act 408, the system resets the demand to zero for the product identified in the user action information. In some embodiments, the system may further decrease a store room inventory level by an amount equal to the decrease in demand.

Some embodiments, applying one or more percentage rules of the demand tracking rules as a function of expected user action, optionally may additionally or alternatively consider a percentage demand in excess of a full case in determining whether a worker is likely to overstock the shelf in excess of the demand in order to stock all the products of an opened case item, versus whether it is more likely the worker under-stocked less than the demand and did not open a subsequent case item leaving the demand at less than a full case. For example, act 406 may additionally include or a separate act can be performed (e.g., following act 406) to evaluate the demand of a product in excess of an integer number of a case item in determining whether to reset the demand to zero (e.g., returning to act 408) or resetting the demand to a modulus (e.g., equal to the number of products in excess of an integer number of case items). As such, when an instruction is issued to restock a shelf, and a worker cannot stock an integer number of case items onto the shelf, a determination can be made based on a percentage demand in excess of an integer number of a case item of whether a worker is more likely to force excess demand of a product onto the shelf to fully stock an integer number of case items, or decide that a worker is likely to restock less than the full demand. For example, a percentage threshold determination break level may be defined and/or determined when demand is in excess of half a case item for some products, while with other products the percentage threshold break level may be one quarter of a case item. This allows the process, based on rules, to determine what a worker likely did in the restocking to achieve more accurate results. The evaluation can include determining when demand includes a fraction or percentage of a case item, and evaluating the size of the fraction of the case item in determining whether the worker likely restocked a full case item in excess of the demand.

This evaluation can consider the product percentage demand in excess of a whole number multiple of a case item. Further, the threshold level or point where it is determined the worker is more likely to overstock can depend on one or more factors, and typically is dependent on multiple factors. Some of the factors include, but are not limited to, a number of products in a case item; size of products (e.g., it may be more difficult for a worker to realize a full case item is not going to fit on the available shelf space when products are smaller, smaller products can be flexed or forced into available space and/or more easily encroach on space intended for one or more other products, etc.); size of products relative to available shelf space; store operation procedures; efficiency of a worker and/or a store (newer workers may be more likely to overstock, less efficient stores may be more likely to overstock, etc.); size of a product relative to a size of a case item (e.g., smaller number of products in a case item allows worker to more easily predict when less than all the products in a case item would fit in available shelf space); and other such factors. Accordingly, the percentage or fraction threshold break level can vary by product, by store, by worker performing the restock, other such factors, and typically a combination of two or more of such factors.

Some embodiments determine whether the demand is greater than a percentage threshold break level of a case item (e.g., modulus >X percent of a case item). Again, this percentage can vary based on the one or more factors. When the modulus is greater than the threshold percentage of the case item, the process advances to act 408, and when the modulus is less than the threshold percentage the demand is reset to the modulus as in act 406. Additionally or alternatively, in some embodiments, the demand tracking component determines a percentage demand in excess of an integer number of case items, and determines whether the percentage demand in excess of the integer number of case items has a predefined relationship with a percentage threshold break level corresponding to the product. The demand tracking component can set the demand to zero responsive to receiving the user action information including the indication that the product sold has been restocked and determining the percentage demand in excess of the integer number of case items has the predetermined relationship with the percentage threshold break level; and can set the demand to the modulus responsive to receiving the user action information including the indication that the product sold has been restocked and determining the percentage demand in excess of the integer number of case items does not have the predetermined relationship with the percentage threshold break level. In some implementations, the demand is set to the modulus by the excess number of items in excess of a full case item and/or decreasing the demand by a value equal to an integer multiple of the packaged quantity.

In act 410, the system determines whether the demand is overstated indicating that the demand level stored for a product is greater than the actual demand for the product in the product display. The system may determine that the demand is overstated based on the user action information received in act 402. For example, the user action information may indicate that the system user restocked a particular display consistent with a user action request and had to return excess products back to the store room. In this example, the system may determine, based on applying one or more overstock rules of the demand tracking rules, that the demand is overstated by an amount equal to the quantity that the user returned to the store room. If the system determines that the demand level is overstated, the system may proceed to optional act 412 and increase the store room inventory. Otherwise, the system proceeds to act 414 and determines whether the demand is understated.

In optional act 412, the system increases a store room inventory associated with the product by applying one or more inventory rules. The system may increase the store room inventory for the product by an amount equal to the excess quantity that the user had to return to the store room.

In act 414, the system determines based on understated rules whether the demand for a product was understated indicating that the demand level for a product is less than the actual demand for the product in the display. The system may determine that the demand is understated based on the user action information received in act 402. For example, the user action information may indicate that the system user stocked a particular display consistent with a user action request and needs to bring an additional quantity of products to the display. In this example, the system may determine that the demand is understated by an amount equal to the remaining space in the product display. If the system determines that the demand level is understated, the system may proceed to act 416 and generate a user request including an instruction to restock the understated product. Otherwise, the process 400 ends.

Furthermore, various aspects and functions described herein in accord with the present disclosure may be implemented as hardware, software, firmware or any combination thereof. Aspects in accord with the present disclosure may be implemented within methods, acts, systems, system elements and components using a variety of hardware, software or firmware configurations. Furthermore, aspects in accord with the present disclosure may be implemented as specially-programmed hardware and/or software.

In some embodiments, the sales floor demand may be updated in response to receiving input (e.g., product sales data, receiving information, etc.), based on a schedule, periodically, and/or other timing. For example, the demand tracking system may update sales floor demand every hour and maintain a running sales floor demand for multiple products on the sales floor. In some instances, the demand tracking system tracks the demand of each product, while other implementations limit which products are tracked and/or how often demand of a product is updated. For example, some products having a higher rate of sales may be updated more often than products having slower rates. In some embodiments, the sales floor demand can define, at least in part, the current need for the product on the sales floor, where need is increased by sales of items of the product, and reduced by receiving shipments of products and restocking (e.g., automated or worker initiated picks).

Sets of one or more rules are applied in determining the demand based on information, the product and other such information. In some implementations, demand is tracked to identify when a case, box or other packaged collection of items of a product are in demand, whether and when to initiate action based on a full case demand, and how to adjust demand based on received information (e.g., sales data, receiving information, action information, etc.). Some rules distinguish between sales floor maximum quantities of more than a case versus maximum quantities of less than a case (e.g., a shelf, bin or the like that is designated to support a first quantity of items of a first product that is more than a full case ("CASE"), versus a shelf, bin or the like that is designated to support a maximum second quantity of items of a second product that is less than a full case ("PARTIAL")). With items associated with the "PARTIAL" designation, the rules typically initiate an action prior to demand reaching a quantity equal to a full case. As a further example, below illustrates sets of configuration rules:

|  | Configuration Name | Add/Subtract | Reset |
|---|---|---|---|
| CASE |  | 1 | 5 |
|  | SFD_CASE_SALE | 2 | 3 |
|  | SFD_CASE_RCVG | 2 | 3 |
|  | SFD_CASE_AUTOPICK | 2 | 3 |
|  | SFD_CASE_MANUALPICK | 3 | 2 |
|  | SFD_CASE_FIB |  |  |
| PARTIAL | SFD_PARTIAL_SALE | 1 | 5 |
|  | SFD_PARTIAL_RCVG | 2 | 3 |
|  | SFD_PARTIAL_AUTOPICK | 2 | 3 |
|  | SFD_PARTIAL_MANUALPICK | 2 | 3 |
|  | SFD_PARTIAL_FIB | 3 | 1 |

The "sale" corresponds to data associated with product sales; "rcvg" corresponds to data associated with the shopping facility getting a receiving of a shipment of the product; "autopick" corresponds to the system identifying a pick or restocking of the sales floor is needed and initiating or scheduling the pick automatically; "manualpick" corresponds to a worker manually initiating a pick or restocking; and "fib" corresponds when items of a product are placed into a bin or other storage in an area of the shopping facility other than the sales floor. In some instances, the configuration name may be associated and/or may further identify a type of item and the identified type of transaction associated with that item (e.g., the SFD_CASE_SALE is for a case pick item sales). The "Add/Subtract" column indicates whether the system is to add or subtract the transaction quantity. For example: some rules apply the following Add/Subtract action:

| Add/Subtract Identifier | Action |
|---|---|
| 1 | Add |
| 2 | Subtract |
| 3 | Ignore |

As a further example, when a sale is detected the sales floor demand in increased (e.g., by the quantity of items sold). As another example, when a pick is implemented and items restocked on the sales floor the demand is decreased (e.g., subtracted by the quantity of items restocked).

The "Reset" indicates an action to reset the demand quantity, and in some instances to reset in response to a demand dropping below zero. For example, the rules may dictate that:

| Reset Identifier | Action |
|---|---|
| 1 | Set to zero |
| 2 | Set to modulus of demand and pack quantity |
| 3 | On negative, set to zero |
| 4 | On negative, set to modulus of demand and pack quantity |
| 5 | No reset |

The "1" causes a reset to zero. The "2" condition causes the modulo to be set to a remainder of a whole case (e.g., when demand is 2½ cases, and a pick is performed, the demand is reset to the ½ case). Each of these are configurable based on what action means and/or how that action is intended to be implemented. As a further example, with SFD_CASE_SALE=1:5 or SFD_PARTIAL_SALE=1:5, the system for sales for case pick or an each pick items, the quantity of the sold items is added to the demand; and there is no need to "reset". In another example, SFD_CASE_RCVG=2:3 or SFD_PARTIAL_RCVG=2:3 can define that for receivings for Case Pick items, the quantity of items of the receiving are subtracted from the demand; and if the demand goes negative, then reset the demand to zero. In some implementations, for example, SFD_CASE_AUTOPICK=2:3, SFD_CASE_MANUALPICK=2:3, SFD_PARTIAL_AUTOPICK=2:3, and SFD_PARTIAL_MANUALPICK=2:3 may define that for picking (both manual and auto) for Case and each Pick items, the quantity of items in in the pick are subtract from the demand; and if the demand goes negative, then reset the demand to zero. As another example, in some embodiments, SFD_CASE_FIB=3:2 may define that for a return to a bin (which is returned from a restocking) for a case pick item, the calculation can be ignored; and the quantity can be reset to the modulo of the demand and the case pack (e.g., an item with a pack quantity of 12 and a demand of 3, the system can reset demand to the modulus of 3 (previous demand) and 12 (pack quantity), or 3; and upon receiving a full case, for a "CASE PICK item" the system would direct that a case not be broken open and simply bin it (e.g., in the backroom), keeping that demand and letting it continue to accumulate until a pick is needed.

Example Computer System

Figure 5:
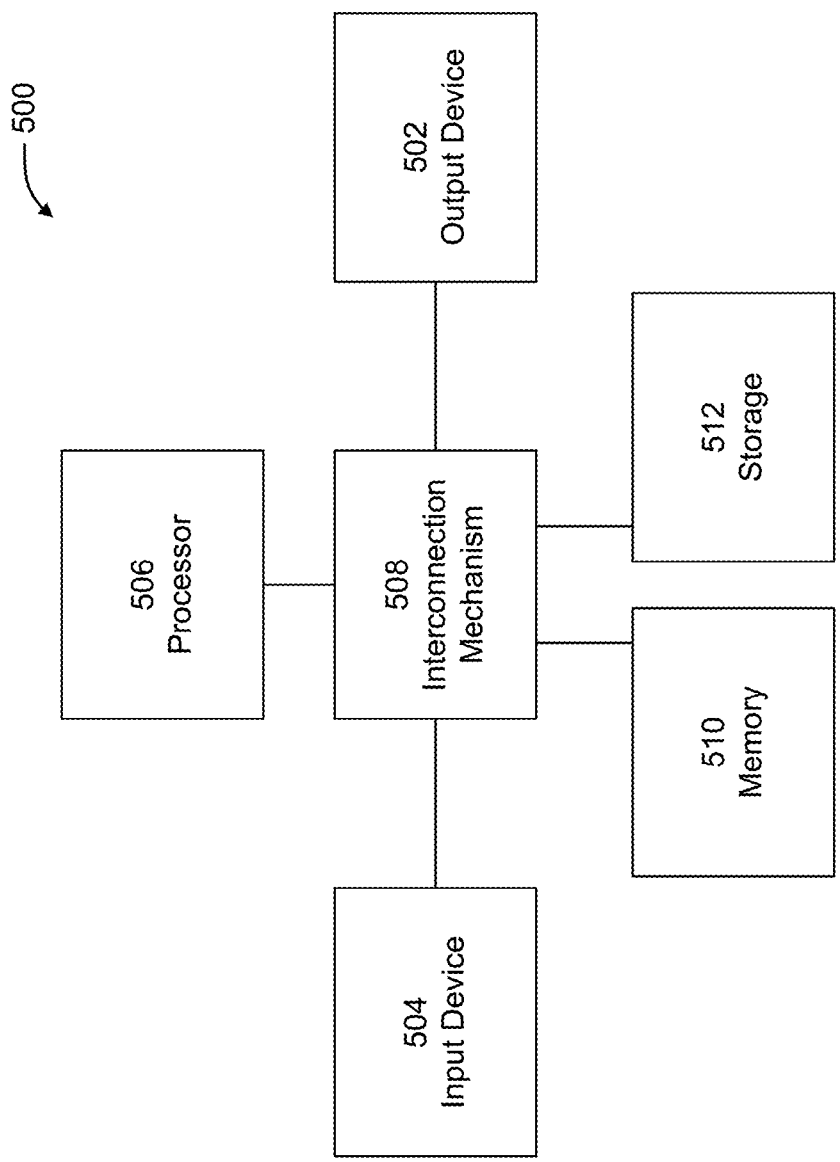
FIG. 5 is a block diagram illustrating computing components forming a computer system in accordance with at least one embodiment described herein.

FIG. 5 illustrates an example block diagram of computing components forming a system 500 which may be configured to implement one or more aspects disclosed herein. For example, the system 500 may be configured to perform one or more demand tracking processes as described above with reference to FIGS. 2-4.

The system 500 may include for example a general-purpose computing platform such as those based on Intel PENTIUM-type processor, Motorola PowerPC, Sun Ultra-SPARC, Texas Instruments-DSP, Hewlett-Packard PA-RISC processors, or any other type of processor. System 500 may include specially-programmed, special-purpose hardware, for example, an application-specific integrated circuit (ASIC). Various aspects of the present disclosure may be implemented as specialized software executing on the system 500 such as that shown in FIG. 5.

The system 500 may include a processor/ASIC 506 connected to one or more memory devices 510, such as a disk drive, memory, flash memory or other device for storing data. Memory 510 may be used for storing programs and data during operation of the system 500. Components of the computer system 500 may be coupled by an interconnection mechanism 508, which may include one or more buses (e.g., between components that are integrated within a same machine) and/or a network (e.g., between components that reside on separate machines). The interconnection mechanism 508 enables communications (e.g., data, instructions) to be exchanged between components of the system 500.

The system 500 also includes one or more input devices 504, which may include for example, a keyboard or a touch screen. An input device may be used for example to configure the measurement system or to provide input parameters. The system 500 includes one or more output devices 502, which may include for example a display. In addition, the computer system 500 may contain one or more interfaces (not shown) that may connect the computer system 500 to a communication network, in addition or as an alternative to the interconnection mechanism 508.

The system 500 may include a storage system 512, which may include a computer readable and/or writeable nonvolatile medium in which signals may be stored to provide a program to be executed by the processor or to provide information stored on or in the medium to be processed by the program. The medium may, for example, be a disk or flash memory and in some examples may include RAM or other non-volatile memory such as EEPROM. In some embodiments, the processor may cause data to be read from the nonvolatile medium into another memory 510 that allows for faster access to the information by the processor/ASIC than does the medium. This memory 510 may be a volatile, random access memory such as a dynamic random access memory (DRAM) or static memory (SRAM). It may be located in storage system 512 or in memory system 510. The processor 506 may manipulate the data within the integrated circuit memory 510 and then copy the data to the storage 512 after processing is completed. A variety of mechanisms are known for managing data movement between storage 512 and the integrated circuit memory element 510, and the disclosure is not limited thereto. The disclosure is not limited to a particular memory system 510 or a storage system 512.

The system 500 may include a general-purpose computer platform that is programmable using a high-level computer programming language. The system 500 may be also implemented using specially programmed, special purpose hardware, e.g. an ASIC. The system 500 may include a processor 506, which may be a commercially available processor such as the well-known Pentium class processor available from the Intel Corporation. Many other processors are available. The processor 506 may execute an operating system which may be, for example, a Windows operating system available from the Microsoft Corporation, MAC OS System X available from Apple Computer, the Solaris Operating System available from Sun Microsystems, or UNIX and/or LINUX available from various sources. Many other operating systems may be used.

The processor and operating system together may form a computer platform for which application programs in high-level programming languages may be written. It should be understood that the disclosure is not limited to a particular computer system platform, processor, operating system, or network. Also, it should be apparent to those skilled in the art that the present disclosure is not limited to a specific programming language or computer system. Further, it should be appreciated that other appropriate programming languages and other appropriate computer systems could also be used.

Having thus described several aspects of at least one example, it is to be appreciated that various alterations, modifications, and improvements will readily occur to those skilled in the art. For instance, examples disclosed herein may also be used in other contexts. Such alterations, modifications, and improvements are intended to be part of this disclosure, and are intended to be within the scope of the examples discussed herein. Accordingly, the foregoing description and drawings are by way of example only.

What is claimed is:

1. A system to track demand in a retail environment including a retail store having a plurality of product displays, the system comprising:
a plurality of point of sale systems configured to obtain and communicate product sales information;
an inventory database maintaining inventory information for a plurality of products offered for sale from in the retail store;
a plurality of networked scanning devices and worker devices operated at the retail store; and
a demand tracking system communicatively coupled over a distributed communication network with the inventory database, the plurality of point of sale systems, the scanning devices and the worker devices, wherein the demand tracking system comprises:
at least one processor coupled to a memory storing information regarding a demand for each product of the plurality of products in the retail store, the demand for each of the plurality of products determined based at least in part on a difference between a determined current quantity of each of the plurality of products on a respective product display of the plurality of product displays on a sales floor and a maximum capacity of the respective product display for the respective one of the plurality of products;
an interface, executed by the at least one processor, configured to: receive over the communication network product sales information from the plurality of point of sale systems, receive over the communication network user action information from at least one of the plurality of networked scanning devices and the worker devices, and generate user action requests and communicate the generated user action requests to one or more of the plurality of networked scanning devices and the worker devices, wherein one or more of the user action requests comprise one or more restock requests to restock one or more products of the plurality of products based on the respective demands of the one or more products;

a demand tracking component, executed by the at least one processor, configured to:

obtain a first set of rules that track product demand as a function of product sales based at least in part on the product sales information;

execute the first set of rules to increase, responsive to receiving product sales information including an indication of a first product sold of the plurality of products and a quantity of the first product sold, the demand maintained in the inventory database for at least the first product by a value equal to the quantity of the first product sold; and obtain a second set of rules that track product demand, and execute the second set of rules to determine when a percentage demand for the first product is in excess of an integer number of case items of the first product, determine whether the percentage demand in excess of the integer number of case items has a predefined relationship with a percentage threshold break level to the first product corresponding to whether an expected user action of restocking would be expected to overstock or understock, and set the demand to zero responsive to receiving the user action information and determining the percentage demand in excess of the integer number of case items has the predetermined relationship with the percentage threshold break level.

2. The demand tracking system of claim 1, wherein the demand tracking component is further configured to obtain a third set of rules that track product demand as a function of user actions, and execute the third set of rules to set the demand to zero responsive to receiving the user action information including an indication that the first product has been restocked.

3. The demand tracking system of claim 1, wherein the first product is one of a case item type and an individual item type.

4. The demand tracking system of claim 3, wherein the demand tracking component is further configured to decrease the demand for the first product at least in part by setting the demand of the first product to zero responsive to the first product having the individual item type.

5. The demand tracking system of claim 3, wherein the demand tracking component is further configured to decrease the demand for the first product at least in part by decreasing the demand by a value equal to an integer multiple of a case quantity responsive to the first product having the case item type.

6. The demand tracking system of claim 1, wherein the demand tracking component is further configured to:

obtain a third set of rules that track product demand as a function of the expected user action, and execute the third set of rules to determine demand is understated for the first product based on the user action information and the expected user action; and generate a first user action request including a first instruction to restock a first quantity of the first product to the product display, the first quantity equal to the understated demand of the first product.

7. The demand tracking system of claim 1, wherein the demand tracking component is further configured to obtain a third set of rules that track product demand as a function of the user action information, and execute the third set of rules to determine whether the demand is overstated for the first product based on the user action information.

8. The demand tracking system of claim 7, wherein the demand tracking component is further configured to decrease the demand for the first product responsive to determining that the demand is overstated.

9. The demand tracking system of claim 1, wherein the interface is further configured to receive product receiving information including an indication of the product received and a quantity of the product received and wherein the demand tracking component is further configured to obtain a third set of rules that track product demand as a function of receiving information, and execute the third set of rules to decrease the demand for the received product responsive to receiving the product receiving information.

10. The demand tracking system of claim 1, further comprising:

obtain a third set of rules that evaluates the demand relative to a first threshold;

execute the second set of rules and determine the demand for the first product has transgressed the first threshold; and generate, responsive to the demand for the first product transgressing the first threshold, a first user action request including a first instruction to restock a first quantity of the first product to the respective product display, the first quantity equal to the demand of the first product; and initiate an automated picking of the first quantity of the first product based on the demand to be restocked on the respective product display on the sales floor of the retail.

11. The demand tracking system of claim 1, wherein the demand tracking component in determining whether the percentage demand in excess of the integer number of case items is configured to predict percentage demand in excess of a full case in determining that a worker is expected to overstock the respective product display in excess of the demand in order to stock all the products of an opened case item of the first product, or determining that the worker is expected to not open a subsequent case item of the first product based on an expectation that all of the products of the subsequent case item of the first product would not fit on the respective product display resulting in the worker understocking less than the demand.

12. A computer implemented method for tracking demand in a retail environment including a retail store having a plurality of product displays, the method comprising:

storing, by a demand tracking system communicatively coupled over a distributed communication network with an inventory database maintaining inventory information for a plurality of products offered for sale from in the retail store, a demand for each product of the plurality of products in the retail store, the demand for each of the plurality of products determined based at least in part on a difference between a determined current quantity of each of the plurality of products on a respective product display of the plurality of product displays on a sales floor and a maximum capacity of the respective product display for the respective one of the plurality of products;

receiving, over the distributed communication network from a plurality of point of sale systems, product sales information obtained by the respective plurality of point of sale systems, wherein the product sales information comprises an indication of a first product sold of the plurality of products and a quantity of the first product sold;

receiving user action information over the distributed communication network from at least one of a plurality of networked scanning devices and worker devices operated at the retail store, generating user action requests and communicating the generated user action requests to one or more of the plurality of networked scanning devices and the worker devices, wherein one or more of the user action requests comprise one or more restock requests to restock one or more products of the plurality of products based on the respective demands of the one or more products;

obtaining a first set of rules that track product demand as a function of product sales based at least in part on the product sales information;

executing the first set of rules and increasing the demand maintained in the inventory database for at least the first product sold by a value equal to the quantity of the first product sold;

obtaining a second set of rules that track product demand;

executing the third set of rules and determining when a percentage demand for the first product is in excess of an integer number of case items of the first product;

determining whether the percentage demand in excess of the integer number of case items has a predefined relationship with a percentage threshold break level corresponding to whether an expected user action of restocking would be expected to overstock or understock; and setting the demand to zero responsive to receiving the user action information and determining the percentage demand in excess of the integer number of case items has the predetermined relationship with the percentage threshold break level.

13. The method of claim 12, wherein the receiving the product sales information further comprises receiving product sales information including an indication of the product type of at least the first product, the product type including one of a case item type and an individual item type.

14. The method of claim 13, further comprising:
receiving the user action information including an indication that the first product has been restocked;
obtaining a third set of rules that track product demand as a function of user actions; and
executing the third set of rules and setting the demand of the first product to zero responsive to receiving the user action information and the first product having the individual item type.

15. The method of claim 13, further comprising:
receiving user action information including an indication that the first product has been restocked; and
decreasing the demand by a value equal to an integer multiple of a case quantity responsive to receiving the user action information and the first product having the case item type.

16. The method of claim 12, further comprising:
obtaining a third set of rules that track product demand as a function of the expected user action, and applying the third set of rules and determining the demand is understated for the first product based on the user action information and the expected user action; and
generating a first user action request including a first instruction to restock a first quantity of the first product to the product display, the first quantity equal to the understated demand of the first product.

17. The method of claim 12, further comprising:
obtaining a third set of rules that track product demand as a function of user action information; and
executing the third set of rules and determining whether the demand is overstated for the first product based on the user action information.

18. The method of claim 17, further comprising decreasing the demand for the first product responsive to determining that the demand is overstated.

19. The method of claim 12, further comprising receiving product receiving information including an indication of the product received and a quantity of the product received; obtaining a third set of rules that track product demand as a function of receiving information, and executing the third set of rules and decreasing the demand for the received product responsive to receiving the product receiving information.

20. A non-transitory computer readable medium having stored thereon sequences of instruction for tracking demand in a retail environment including a retail store having a plurality of product displays, including instructions that will cause at least one processor to:

store, by a demand tracking system communicatively coupled over a distributed communication network with an inventory database maintaining inventory information for a plurality of products offered for sale from in the retail store, a demand for each product of the plurality of products in the retail store, the demand for each of a plurality of products determined based at least in part on a difference between a determined current quantity of each of the plurality of products on a respective product display of the plurality of product displays on a sales floor and a maximum capacity of the respective product display for the respective one of the plurality of products;

receive, over the distributed communication network from a plurality of point of sale systems, product sales information obtained by the respective plurality of point of sale systems, wherein the product sales information comprises an indication of a first product sold of the plurality of products and a quantity of the first product sold;

receive user action information over the distributed communication network from at least one of a plurality of networked scanning devices and worker devices operated at the retail store, generating user action requests and communicating the generated user action requests to one or more of the plurality of networked scanning devices and the worker devices, wherein one or more of the user action requests comprise one or more restock requests to restock one or more products of the plurality of products based on the respective demands of the one or more products;

obtain a first set of rules that track product demand as a function of product sales based at least in part on the product sales information;

execute the first set of rules to increase the demand maintained in the inventory database for at least the first product sold by a value equal to the quantity of the first product sold;

obtain a second set of rules that track product demand;

execute the third set of rules to determine when a percentage demand for the first product is in excess of an integer number of case items of the first product;

determine whether the percentage demand in excess of the integer number of case items has a predefined relationship with a percentage threshold break level corresponding to whether an expected user action of restocking would be expected to overstock or understock; and
set the demand to zero responsive to receiving the user action information and determine the percentage demand in excess of the integer number of case items has the predetermined relationship with the percentage threshold break level.

* * * * *